No. 828,318. PATENTED AUG. 14, 1906.
J. O. JOHNSON.
APPARATUS FOR FORMING HOLLOW GLASS ARTICLES.
APPLICATION FILED JULY 13, 1905.

3 SHEETS—SHEET 1.

WITNESSES
R A Balderson.
Warren W Swartz

INVENTOR
J. O. Johnson
by Bakewell & Byrnes
his attys

No. 828,318. PATENTED AUG. 14, 1906.
J. O. JOHNSON.
APPARATUS FOR FORMING HOLLOW GLASS ARTICLES.
APPLICATION FILED JULY 13, 1905.

5 SHEETS—SHEET 2.

WITNESSES
R A Balderson
Warren W. Swartz

INVENTOR
J. O. Johnson
by Bakewell & Byrnes
his attys

No. 828,318. PATENTED AUG. 14, 1906.
J. O. JOHNSON.
APPARATUS FOR FORMING HOLLOW GLASS ARTICLES.
APPLICATION FILED JULY 13, 1905.
5 SHEETS—SHEET 3.
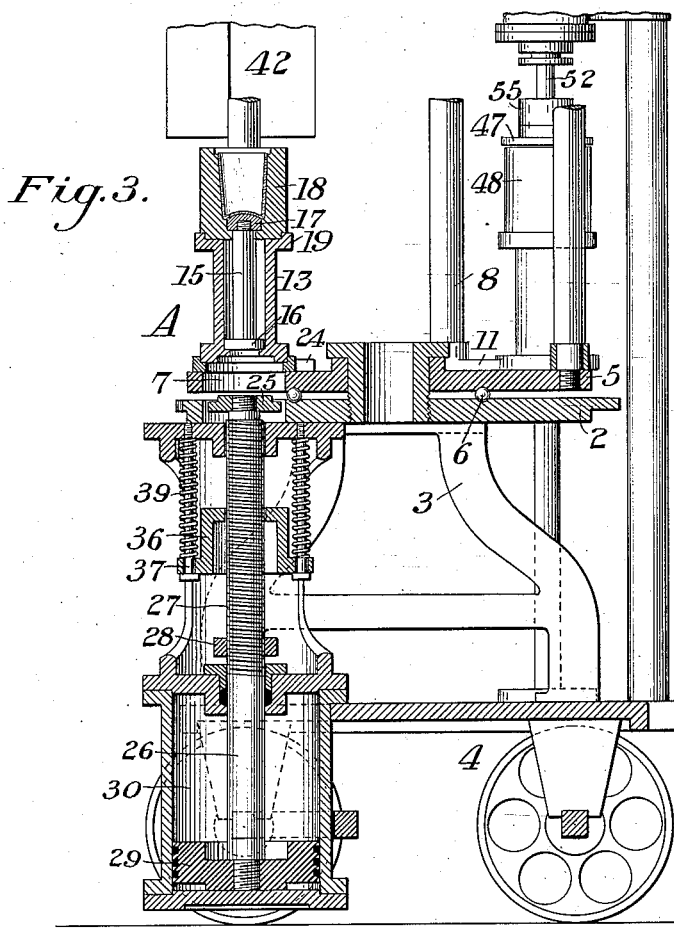
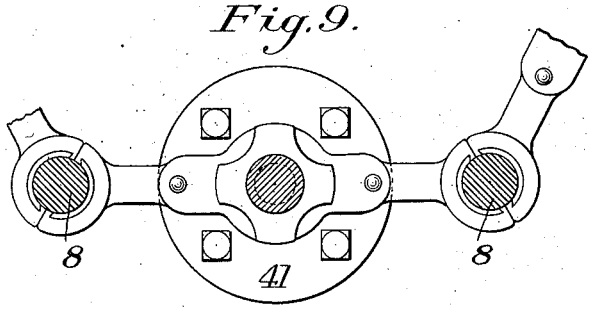
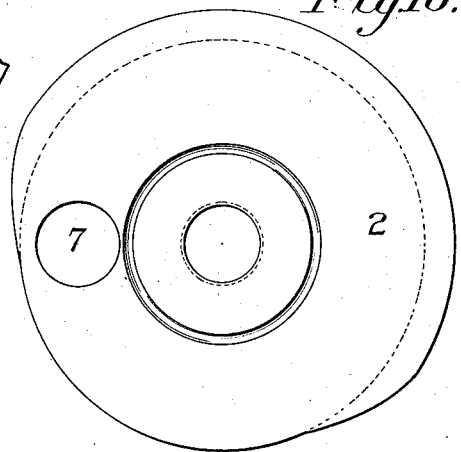
WITNESSES
R. A. Balderson.
Warren W. Swartz
INVENTOR
J. O. Johnson
by Bakewell & Byrnes
his attys No. 828,318. PATENTED AUG. 14, 1906.
J. O. JOHNSON.
APPARATUS FOR FORMING HOLLOW GLASS ARTICLES.
APPLICATION FILED JULY 13, 1905.
5 SHEETS—SHEET 4.
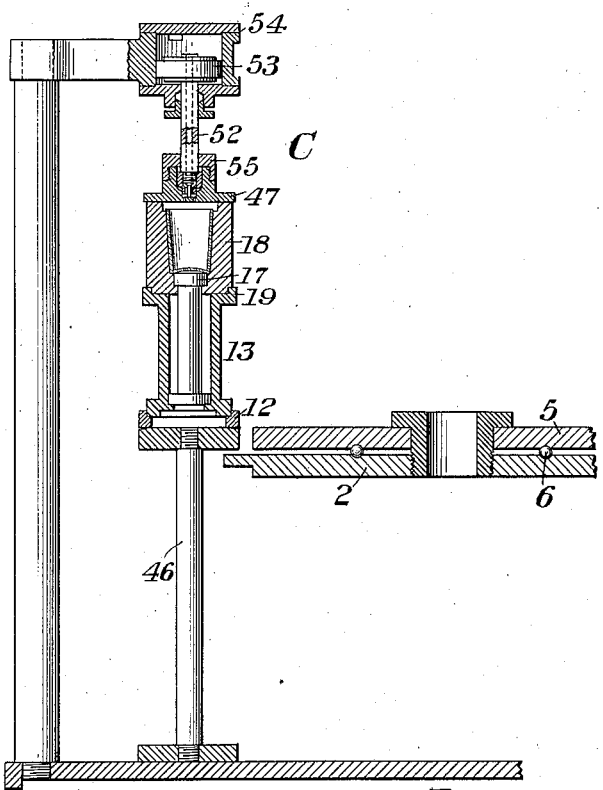
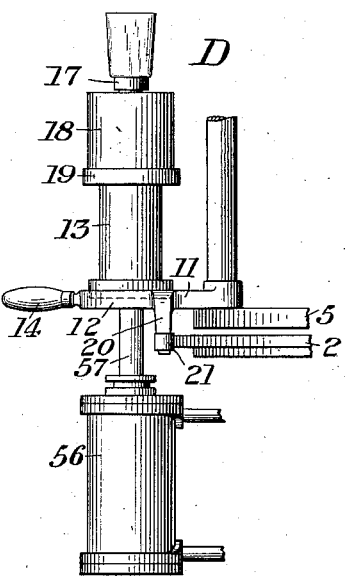
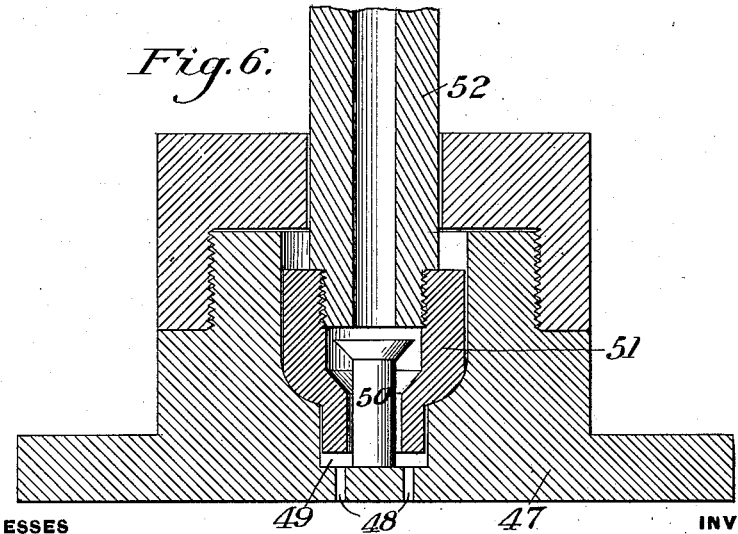
WITNESSES
R A Balderson
Warren W Swartz
INVENTOR
J. O. Johnson
by Bakewell & Byrnes
his attys

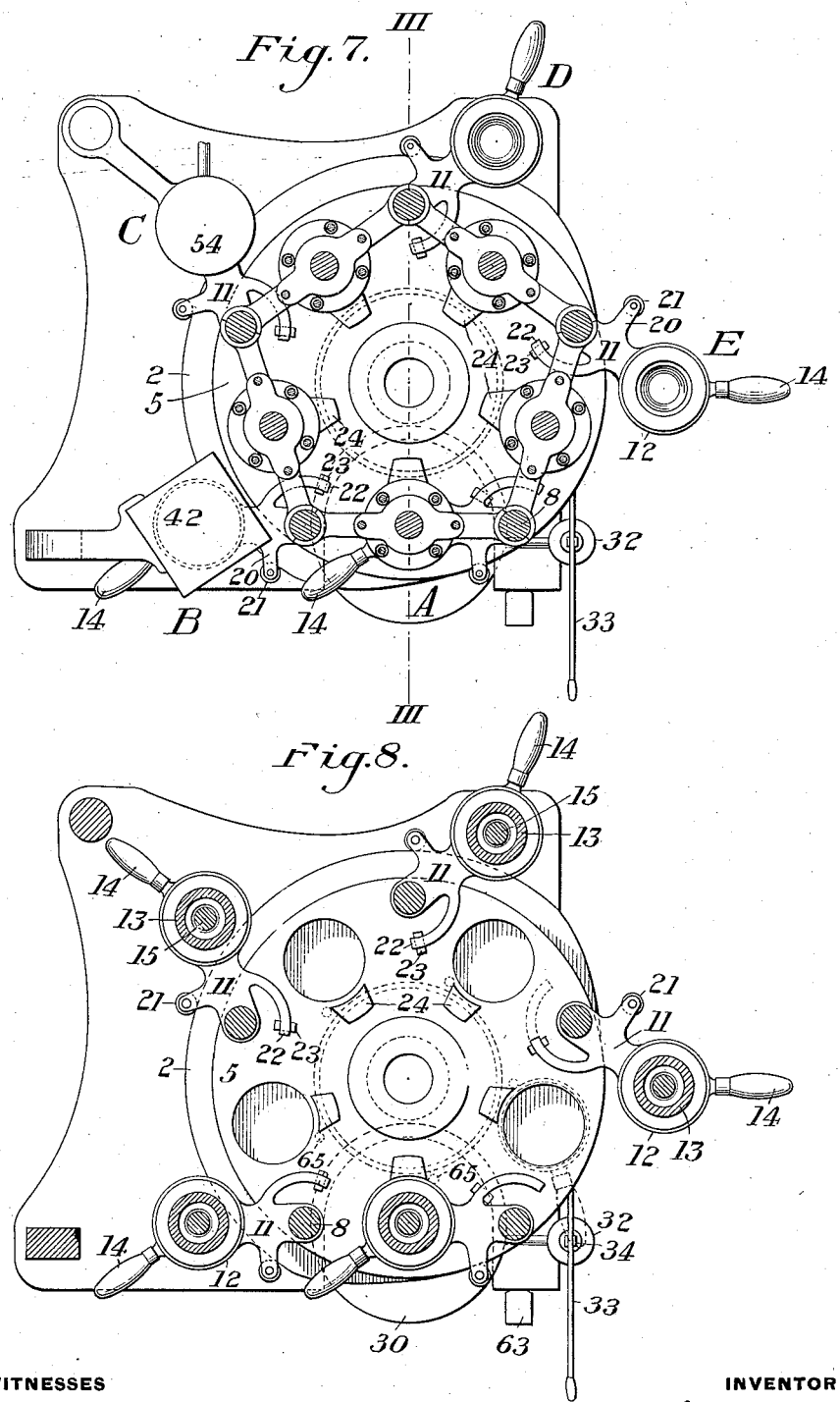

UNITED STATES PATENT OFFICE.

JESSE O. JOHNSON, OF PITTSBURG, PENNSYLVANIA, ASSIGNOR OF ONE-HALF TO HENRY C. FRY, OF ROCHESTER, PENNSYLVANIA.

APPARATUS FOR FORMING HOLLOW GLASS ARTICLES.

No. 828,318. Specification of Letters Patent. Patented Aug. 14, 1906.

Application filed July 13, 1905. Serial No. 269,479.

*To all whom it may concern:*

Be it known that I, JESSE O. JOHNSON, of Pittsburg, Allegheny county, Pennsylvania, have invented a new and useful Apparatus for Forming Hollow Glass Articles, of which the following is a full, clear, and exact description, reference being had to the accompanying drawings, forming part of this specification, in which—

Figure 1:
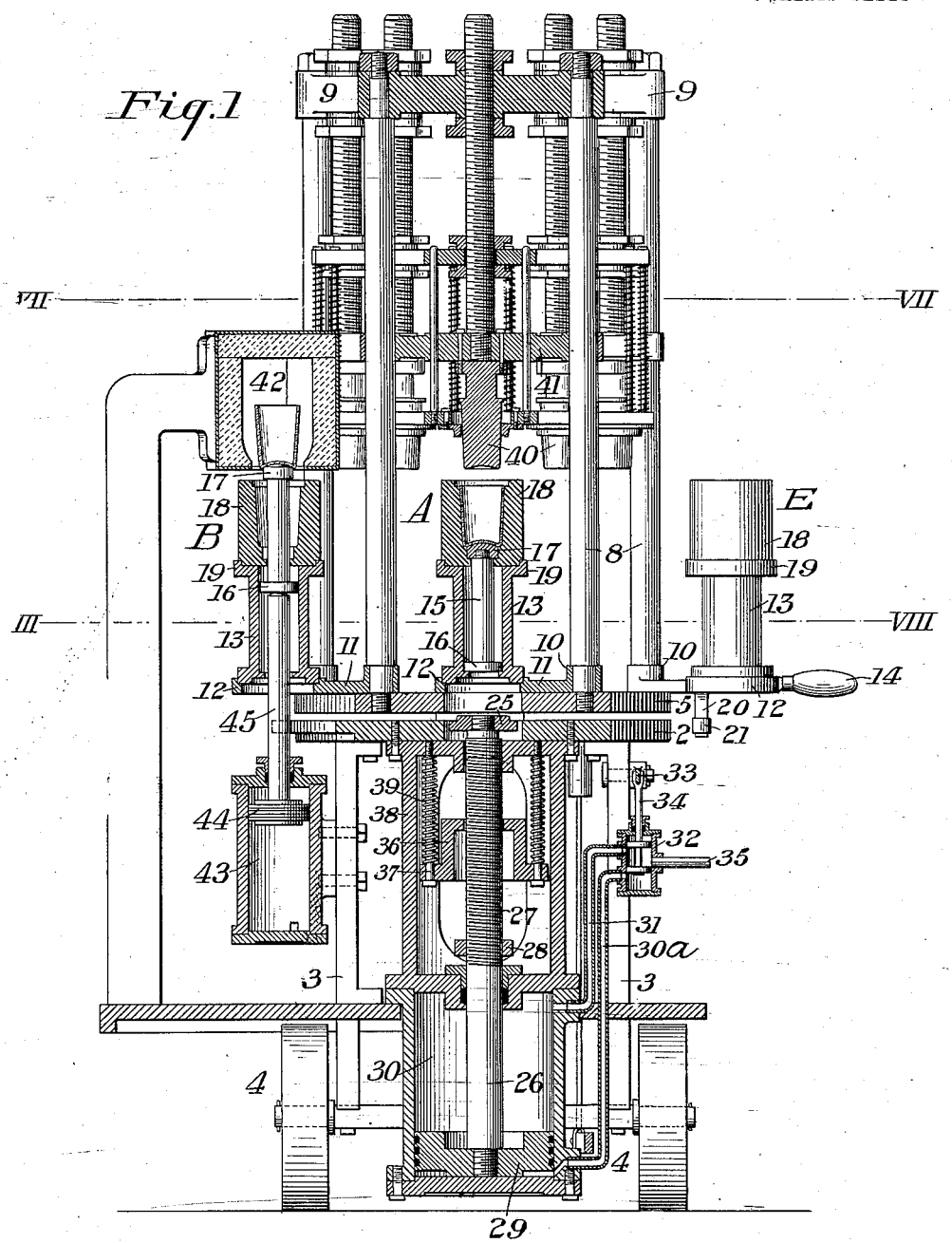
Figure 2:
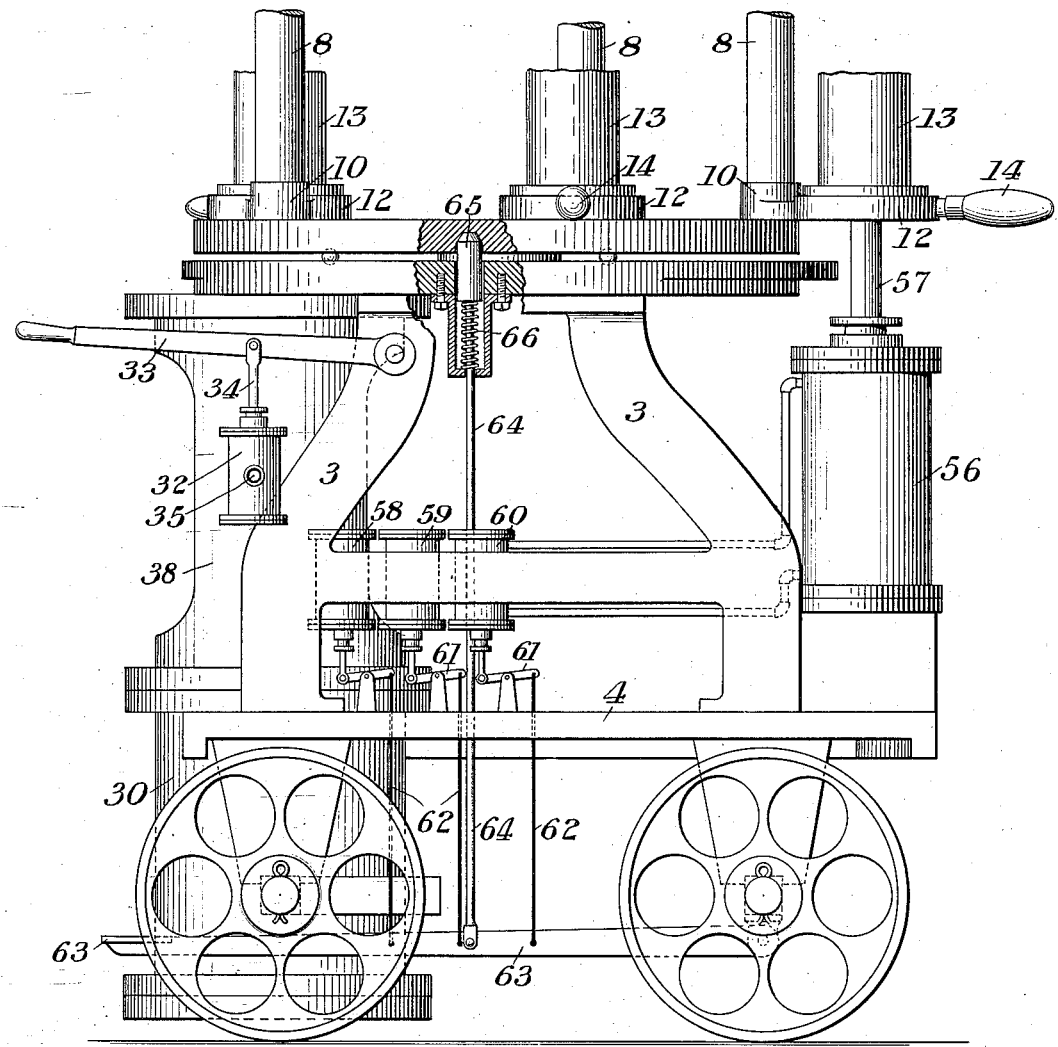

Figure 1 is a sectional front elevation of my improved apparatus. Fig. 2 is a partial side elevation showing part of the valve mechanism and the table-lock. Fig. 3 is a partial section at the pressing-station on line III III of Fig. 7. Fig. 4 is a sectional view at the blowing-station. Fig. 5 is a detail elevation showing the step of ejecting. Fig. 6 is a detail view of the blow-head valve. Figs. 7 and 8 are sectional plan views on the lines VII VII and VIII VIII, respectively, of Fig. 1. Fig. 9 is a partial cross-section showing the frame-bracing, and Fig. 10 is a plan view of the cam base-plate.

My invention relates to the forming of hollow glass articles which are open at one end and is designed to provide a new and improved apparatus therefor.

In carrying out my invention in its preferred form the tumbler or other hollow glass article is pressed at a pressing-station. It is then moved out of the mold and reheated and fire-polished, preferably by moving it into a furnace. It is then moved back into the mold and expanded therein, preferably by air-pressure, to reshape it to the desired form, and it is then ejected as a finished tumbler. In connection with the pressing of the hollow article I employ a peculiar improved spring arrangement, whereby a finer edge may be given to the tumbler than heretofore, where machine methods have been employed, and to obtain the result of hand methods where the operator can regulate the pressure according to the amount of glass in the mold. I thus avoid the crushing of the edge at the open end, which often results with the use of machine by reason of excess pressure being applied.

In the drawings, 2 represents a stationary base-plate which is preferably of general circular form, a part of its edge portion being cut away, as shown in Fig. 10, so that this plate acts as a cam against rollers on the molds, as hereinafter described. This plate is preferably carried on the side legs 3, which are carried on the truck-frame 4 of a wheeled truck. The machine may of course be stationary, but is preferably carried on a truck, as shown, so that it may be moved from place to place. A circular rotary plate 5 rests on the base-plate 2, being preferably carried on ball-bearings, (shown at 6.) This rotary plate carries the main portion of the apparatus, including the molds, and is provided with five holes equidistant from its axis, each of which holes may be brought into registry with the hole in the base-plate which is shown at 7 in Fig. 10, which is at the pressing-station. Adjacent to each hole in the rotary plate is a post or standard, the lower end of which is secured in the rotary plate 5, while its upper end is secured in the upper spider 9. The lower end portion in each standard is recessed to form a bearing for the collar 10 of the arm 11, which carries the mold-cage. There are five of these arms 11, each having a ring 12 at its outer end into which seats the mold-cage 13. Each ring 12 is provided with a handle 14, by which the mold may be swung into and out of operative position, and within the cage 13 is a stem 15, having an enlarged lower portion 16, which fits neatly within the cage, while its upper part 17 forms the mold-bottom or mold-valve. The mold 18 is arranged to seat and fit within the upper enlarged portion 19 of the cage, the mold thus being centered thereon. Each ring or mold carrier 12 is provided with a depending pin 20, carrying a friction-roller 21, which is arranged to engage the cam edge of the stationary plate 2 after the pressing operation has taken place and the mold begins its movement to the reheating-station during the revolution of the table 5. To hold the friction-roller against the cam, each arm 11 is provided with a latch 22, having a hooked end arranged to engage a projection 23 on the movable table. When the operator swings the mold into place at the pressing-station, this latch moves over the projection, which projection holds the roller in contact with the cam as the mold is carried around the table. In order to limit the inward movement of the mold as the operator swings it into place, I provide stops 24 on the movable table, against which the rings 12 strike when the mold is thrown in.

At the pressing-station (marked A) a shouldered circular plate 25 is secured to the upper end of a piston-rod 26, having a screw-threaded portion 27, provided with an adjustable nut 28. The piston 29 moves within a cylinder 30, which is carried on the truck-frame and is provided with inlet and exhaust pipes 30ª and 31, leading to a valve-cylinder 32, containing a double piston-valve operated by hand-lever 33 through the link 34.

35 is the inlet for compressed air to the valve-cylinder.

Surrounding the piston-rod 26 is a recessed collar 36, having a rim through which bolts 37 extend loosely, these bolts being screwed into the top of the surrounding cage 38. Spiral springs 39 surround these two bolts and exert a downward pressure upon the collar 36, normally holding it down against the heads of the bolts. When the piston 29 is forced upwardly, it will move upwardly until the plate 25 enters the corresponding annular recess in the bottom of the cage 13, when the mold and cage will then be carried up to press the glass around the plunger 40, secured on the plunger cross-head 41. After the pressing of the glass has begun around the plunger the nut 28 strikes the upper part of the collar 36 and begins to compress the springs 39. These springs act to oppose the pressure of the air beneath the piston, and by adjusting the position of the nut I can regulate the distance of the stroke, so that this distance will change for varying amounts of glass in the mold. By this combination of the use of motive fluid for pressing, in combination with a yielding resistance therefor, which opposes the motive fluid, I can automatically regulate the stroke according to the amount of glass in the mold, and thus prevent crushing of the edge of the blank. It will be noted that the springs have a fixed backing or resistance and that they oppose the motive fluid, so that by regulating the springs and the nut I can stop the movement of the mold whenever the pressure reaches a predetermined limit.

The cross-head for the plunger 40 is of the usual spring type, and after the operator has admitted fluid to the cylinder 30, and thus forced the mold up around the plunger to press the blank, he reverses the valve 32, thus allowing the mold to retract. At the next station B the blank is lifted out of the mold into a small furnace 42, which is open-bottomed and is preferably heated by suitable gas-burners. As the rotary plate turns to bring the pressed blank to its station the cam on the stationary table forces out the mold to bring it into proper alinement with the bottom hole in the furnace and with the cylinder 43, which is fixed to the side frame. This cylinder 43 is provided with a piston 44, having a piston-rod 45, which is arranged to move up through the hole in the ring 12 to the mold-cage and strike the stem-enlargement 16 of the mold-bottom. The mold-bottom is thus moved up to carry the blank upwardly into the position shown in Fig. 1. The blank remains in the furnace during the pressing of the next blank and is then lowered into the same mold in which it was pressed by exhausting the air from the cylinder 43. At the next turn of the table the reheated and fire-polished blank within its mold is carried to the blowing-station C. At this station, as shown in Fig. 4, the ring 12 rests on a supporting-stand 46, and a blow-head is forced down upon the open top of the mold. This blow-head, as shown in detail in Fig. 6, has a circular plate 47 with holes 48, leading into a chamber 49, containing the valve 50. This valve has an edge which seats downwardly on the conical seat of a ring 51, which is secured to the hollow stem 52, which forms the piston-rod of piston 53, moving in the small motive cylinder 54. A cap 55 is screwed upon the upper part of the plate 47, and when fluid is admitted to the cylinder 54 the plate 47 strikes the top of the mold, while the hollow piston-stem forces the collar 51 down away from the valve. The compressed air is thus admitted to the mold, thus expanding the blank and reshaping it. The heating and fire-polishing operation is liable to slightly deform the article, which will thus be reformed to its proper shape. After this operation the compressed air is admitted below the piston 53, thus first lifting the stem 52 to close the valve and then lifting the blow-head away from the mold. At the next turning operation the mold is carried to the ejector-station D. (Shown in Fig. 5.) At this station is a lower motive cylinder 56, containing a piston with a stem 57, which is arranged to strike the lower end of the stem 15 of the mold-bottom, and thus force up the mold-bottom to lift the article above the mold, as shown in Fig. 5. A boy then removes the finished article, which is taken to the leer. At the next turn the mold reaches the idle station E, at which station the mold is allowed to cool off before it reaches the compressing-station, where the glass is dropped into it or the mold reheating it in any desirable way.

The supply and exhaust pipes leading to the cylinders 43, 54, and 56 extend to three valve-chests 58, 59, and 60. The valves in these chests are connected by levers 61 and links 62 to a foot-lever 63. To this lever is also connected a link 64, having a spring-latch 65, arranged to engage successively five recesses in the rotary table, and thus lock the molds at the successive stations.

In a normal raised position of the foot-lever, to which it is raised by the spring 66 of the latch, the valves are in position to supply fluid to their motive cylinders. When the foot-lever is pressed part way down, the valves shift to exhaust the motive fluid from the three cylinders, and when the foot-lever is fully depressed the latch is drawn out of engagement with the table, thus allowing the table to be turned to bring the blanks to the next successive stations. This turning is preferably done by hand, though it may be done automatically, if desired.

It will be seen that while the pressing operation is being carried out at station A another blank is being fire-polished at station B, a third blank is being expanded and reshaped at station C, and a fourth article is being ejected, and after the pressing operation the operator presses down the foot-treadle for a part of its distance, thus lowering the article into the mold at the reheating-station, lifting the blow-head at the blowing-station and retracting the mold-bottom at the ejecting-station. As the operator depresses the foot-treadle part way he also moves the hand-lever to exhaust the air from the cylinder at the pressing-station, allowing the mold to return to place. He then pushes the foot-lever down its full extent to withdraw the locking-latch and turns the table a part of a revolution to bring the blanks to the next successive stations.

The yielding resistance or back-pressure device, which opposes the action of the motive fluid, is additional to and independent of the usual springs for the spring-plate. These springs cannot be used for the purpose of my invention, for the reason that if such springs could be adjusted properly for that purpose they would not perform properly their own function—viz., to hold the spring-plate in proper position.

The advantages of my invention will be apparent to those skilled in the art. The back-pressing device overcomes the difficulty of crushing the edge of the article where the glass is slightly in excess of the exact amount required. In other words, this pressing apparatus automatically compensates for varying amounts of glass. The reheating and fire-polishing of the blank does away with the hand operations heretofore necessary with pressed articles, while the expanding operation corrects any slight deforming of the article and reshapes it to final form. The use of skilled workmen in reshaping the pressed article after the reheating is thus done away with. A large output of finely-finished articles may thus be obtained at lower labor cost. The pressing device may be used with or without the remainder of the apparatus and is capable of general application. The reheating and reshaping may be employed with ordinary pressing apparatus, and many other changes may be made in the form and arrangement of the apparatus without departing from my invention.

I claim—

1. In glass-pressing apparatus having a pressing-plunger and a spring-plate, a motive-fluid cylinder for actuating the press, and a yielding resistance independent of the spring-plate, and arranged to act against the motive fluid during and at the completion of the pressing operation; substantially as described.

2. In glass-pressing apparatus having a pressing-plunger and a spring-plate, a motive-fluid cylinder, a yielding resistance independent of the spring-plate and arranged to act against the motive fluid during the final portion of the pressing stroke, and means for adjusting the point in the stroke at which the yielding resistance is applied; substantially as described.

3. In glass-pressing apparatus having a pressing-plunger and a spring-plate, the combination with a motive-fluid cylinder for applying pressure, of springs arranged to resist the action of the motive fluid, said springs being independent of the spring-plate springs, means for bringing said spring into action during the time the pressing operation is being completed and means for adjusting the point in the stroke at which the springs are brought into action; substantially as described.

4. In glass-pressing apparatus having a pressing-plunger and a spring-plate, a motive-fluid cylinder, and a yielding resistance having a stationary backing and independent of the spring-plate, and means for bringing the yielding resistance into action during the time the pressing operation is being completed; substantially as described.

5. In glass-pressing apparatus having a pressing-plunger and a spring-plate, a motive cylinder for the moving member of the press, a stem connected to said moving member, a spring having a fixed bearing, and an abutment on the stem arranged to effect a compression of the said spring after the moving member has moved a portion of its stroke; substantially as described.

6. In glass-pressing apparatus, a pressing-station, an open press-mold, means for pressing an article in said mold at the pressing-station, a reheating-station, means for transferring the pressed article in its forming-mold from the pressing to the reheating station, and means for moving the article out of the mold, reheating it and returning it to the same mold; substantially as described.

7. In glass-pressing apparatus, an open press-mold having a movable bottom, a heating device, and mechanism for moving the bottom to bring the article into heating position, said mechanism being arranged to replace the blank within the mold after the reheating and means for transferring the mold to a reshaping-station; substantially as described.

8. In glass-pressing apparatus, mechanism for moving the pressed article out of the mold, means for reheating the same, and mechanism for reshaping the article after reheating and means for moving the mold from the reheating to the reshaping station; substantially as described.

9. In glass-pressing apparatus, a movable mold-bottom, means for moving the bottom to lift the article out of the mold, means for heating the article while in the lifted position, means for replacing the article in the mold, and a blow-head arranged to expand the article in the mold and means for carrying the mold from the heating to the reshaping station; substantially as described.

10. Glass-forming apparatus having a pressing-station, a reheating-station, means for transferring the pressed blank in its forming-mold to the reheating-station and for removing said blank, reheating it, and returning it to the same mold, a reshaping-station, and means for transferring the blank and its mold to the reshaping-station and then reshaping it; substantially as described.

11. Glass-pressing apparatus having a reheating-station, a reshaping-station, an ejecting-station, and means for successively reheating, reshaping and ejecting the article; substantially as described.

In testimony whereof I have hereunto set my hand.

JESSE O. JOHNSON.

Witnesses:
JOHN MILLER.
H. M. CORWIN.